United States Patent
Simon et al.

(10) Patent No.: US 7,716,269 B2
(45) Date of Patent: *May 11, 2010

(54) METHOD AND SYSTEM FOR PERFORMING PARALLEL INTEGER MULTIPLY ACCUMULATE OPERATIONS ON PACKED DATA

(75) Inventors: Moshe B. Simon, San Ramon, CA (US); Erik P. Machnicki, Sunnyvale, CA (US); David A. Harrison, Cupertino, CA (US); Rakesh K. Singh, Pune (IN)

(73) Assignee: Cradle Technologies, Mountain View, CA (US)

( * ) Notice: Subject to any disclaimer, the term of this patent is extended or adjusted under 35 U.S.C. 154(b) by 1304 days.

This patent is subject to a terminal disclaimer.

(21) Appl. No.: 11/153,979

(22) Filed: Jun. 16, 2005

(65) Prior Publication Data
US 2005/0235026 A1 Oct. 20, 2005

Related U.S. Application Data

(63) Continuation of application No. 10/775,461, filed on Feb. 9, 2004, now Pat. No. 7,043,518.

(51) Int. Cl.
*G06F 7/38* (2006.01)
(52) U.S. Cl. ..................................... 708/523
(58) Field of Classification Search ........................ None
See application file for complete search history.

(56) References Cited

U.S. PATENT DOCUMENTS

| | | | |
|---|---|---|---|
| 6,035,316 A * | 3/2000 | Peleg et al. .................. | 708/523 |
| 6,230,180 B1 | 5/2001 | Mohamed | |
| 6,282,556 B1 | 8/2001 | Chehrazi et al. | |
| 6,385,634 B1 | 5/2002 | Peleg et al. | |
| 6,611,856 B1 | 8/2003 | Liao et al. | |
| 2003/0097391 A1 | 5/2003 | Saulsbury | |
| 2004/0117422 A1* | 6/2004 | Debes et al. ................. | 708/523 |
| 2004/0220992 A1* | 11/2004 | Peleg et al. .................. | 708/523 |

OTHER PUBLICATIONS

Paper: Nathan Slingerland et al., Performance Analysis of Instruction Set Architecture Extensions for Multimedia:, 23 pages.

* cited by examiner

*Primary Examiner*—David H Malzahn
(74) *Attorney, Agent, or Firm*—Schneck & Schneck

(57) ABSTRACT

A multiply accumulate unit ("MAC") that performs operations on packed integer data. In one embodiment, the MAC receives 2 32-bit data words which, depending on the specified mode of operation, each contain either four 8-bit operands, two 16-bit operands, or one 32-bit operand. Depending on the mode of operation, the MAC performs either sixteen 8×8 operations, four 16×16 operations, or one 32×32 operation. Results may be individually retrieved from registers and the corresponding accumulator cleared after the read cycle. In addition, the accumulators may be globally initialized. Two results from the 8×8 operations may be packed into a single 32-bit register. The MAC may also shift and saturate the products as required.

28 Claims, 9 Drawing Sheets

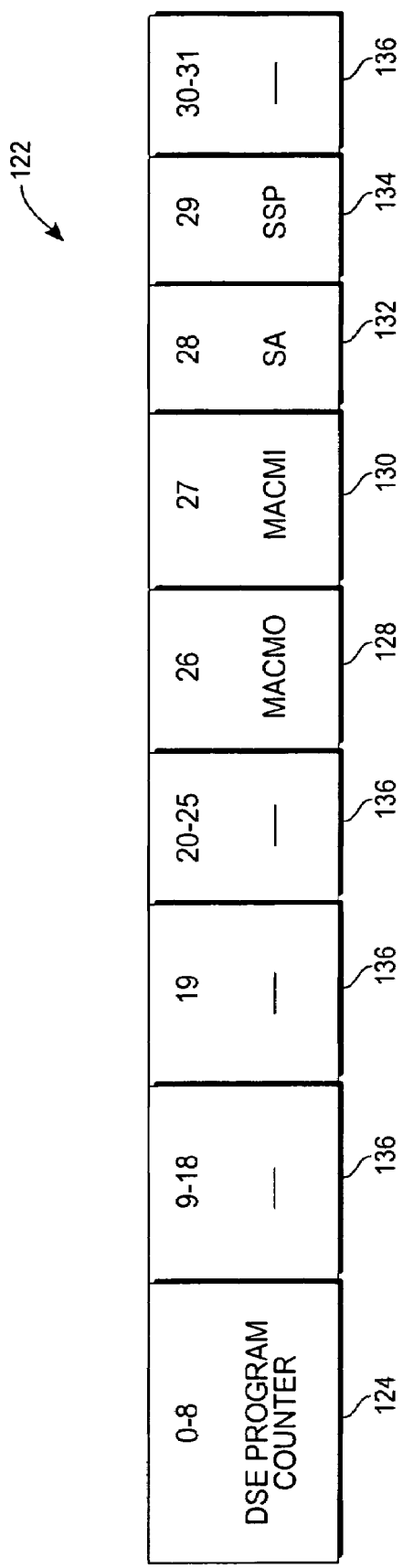
Fig._2

| | OPERANDS | NO. OPERATIONS/CYCLE | RESULTS |
|---|---|---|---|
| 8X8 MODE | 4 INDEPENDENT 8-BIT OPERANDS/WORD (EACH INDEPENDTLY CONFIGURED ASSIGNED OR UNSIGNED) | 16 8X8 MACS/CYCLE | 16 16-BIT PRODUCTS ACCUMULATED INTO 16 SIGNED 20 BIT ACCUMULATOR REGISTERS |
| 16X16 MODE | 2 INDEPENDENT 16-BIT OPERANDS/WORD (EACH INDEPENDTLY CONFIGURED ASSIGNED OR UNSIGNED) | 4 16X16 MACS/CYCLE | 4 32-BIT PRODUCTS ACCUMULATED INTO 4 SIGNED 40 BIT ACCUMULATOR REGISTERS |
| 32X32 MODE | 2 32-BIT OPERANDS/WORD | 1 32X32 MAC/CYCLE | 1 64-BIT PRODUCT ACCUMULATED INTO 1 OF 4 SIGNED 80 BIT ACCUMULATOR REGISTERS |

Fig._3

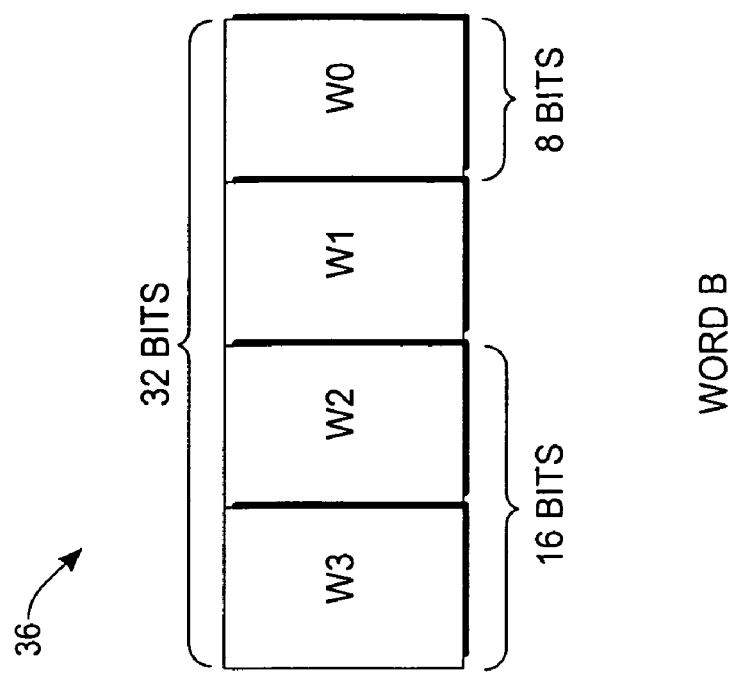
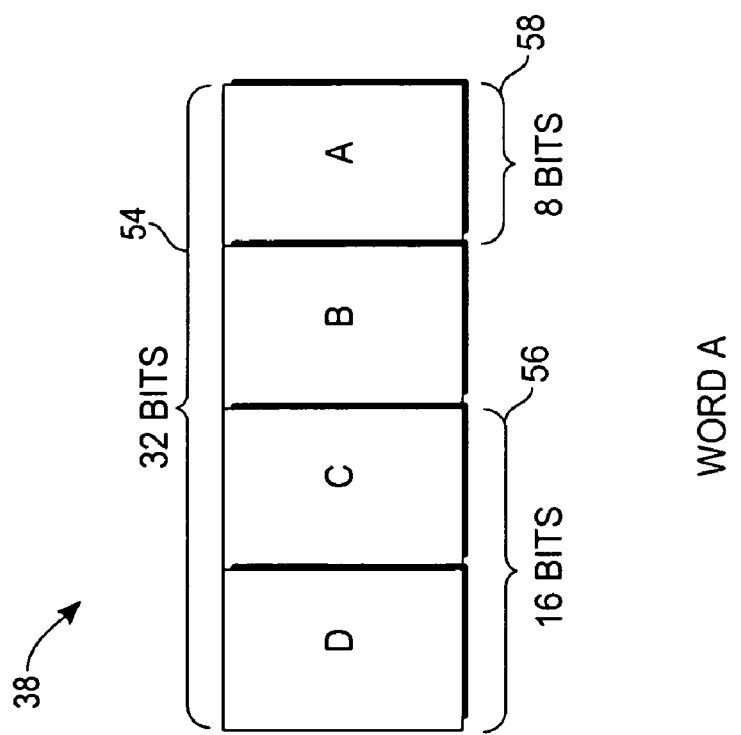
Fig. – 4

Fig. _5

METHOD AND SYSTEM FOR PERFORMING PARALLEL INTEGER MULTIPLY ACCUMULATE OPERATIONS ON PACKED DATA

CROSS REFERENCE TO RELATED APPLICATION

This is a continuation of application Ser. No. 10/775,461 filed Feb. 9, 2004 now U.S. Pat. No. 7,043,518.

FIELD OF THE INVENTION

This invention relates to a multiply-accumulate unit of a processor, particularly a multiply-accumulate unit which can perform parallel integer multiply accumulate operations on packed data.

BACKGROUND ART

Multiply-accumulate units ("MACs") perform multiplication and accumulation operations in a single instruction cycle in a processor. Usually, the result of a multiplication operation is added, or accumulated to, another result stored in an accumulator, or register. These units are often used to speed up video/graphics applications as well as digital signal processor operations such as convolution and filtering.

Single instruction, multiple data ("SIMD") style processing has been used to accelerate multimedia processing. Instruction sets for processors often include SIMD instructions where multiple data elements are packed in a single wide register, with the individual data elements operated on in parallel. One example is Intel's MMX (multimedia extension) TM instruction set. This parallel operation on data elements accelerates processing.

As noted above, MAC operations are used to accelerate various applications. In addition to speed, it would be desirable to have an architecture that is capable of handling multiply and accumulate operations for different-sized operands as required by the instruction (i.e., 8×8 operations, 16×16 operations, etc.). It would also be desirable to be able to retrieve individual results of MAC operations and clear the corresponding accumulator. In addition, it would be advantageous to have a MAC unit which could provide the cross-product of operands, pack results into one register, and shift results where desired.

SUMMARY OF THE INVENTION

These goals have been met by a MAC that performs multiply accumulate operations on packed integer data. In one embodiment, the MAC receives 2 32-bit data words which, depending on the specified mode of operation, each contain either four 8-bit operands, two 16-bit operands, or one 32-bit operand. Depending on the mode of operation, the MAC performs either sixteen 8×8 operations, four 16×16 operations, or one 32×32 operation. Results may be individually retrieved from registers and the corresponding accumulator cleared after the read cycle. In addition, the accumulators may be globally initialized. Two results from the 8×8 operations may be packed into a single 32-bit register. The MAC may also shift and saturate the products as required.

BRIEF DESCRIPTION OF THE DRAWINGS

FIG. 2 is a block diagram of a processor status word used with the apparatus of FIG. 1.

FIG. 3 is a chart of modes of operation and resulting operands, number of operations per cycle, and obtained results for the apparatus of FIG. 1.

FIG. 4 is a block diagram of data words used as input in the apparatus of FIG. 1.

DETAILED DESCRIPTION OF THE INVENTION

Figure 1:
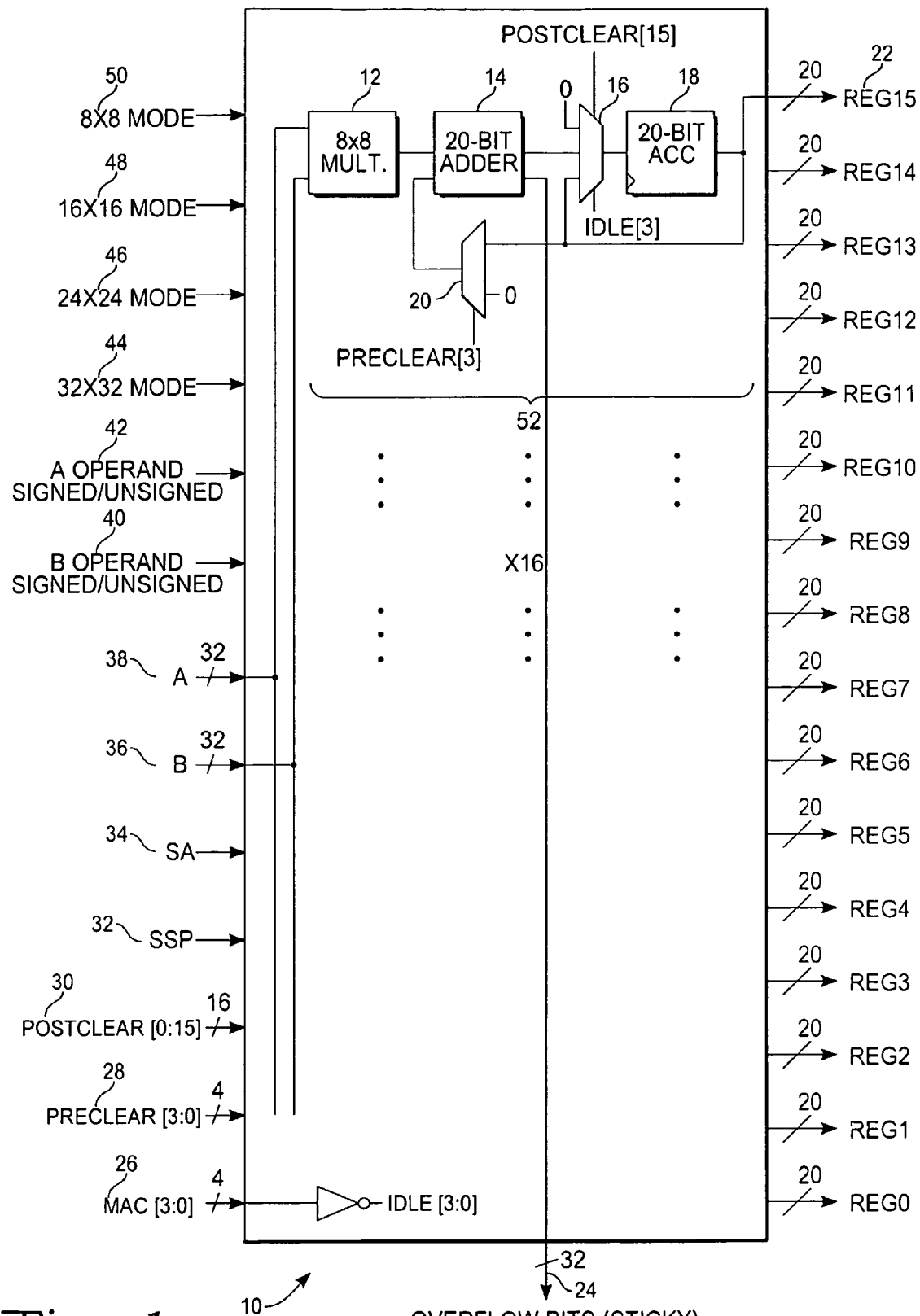
FIG. 1 is a block diagram of the multiply accumulate unit ("MAC") of the invention.

In one embodiment of the invention, the MAC is part of a digital signal engine ("DSE") coprocessor. In FIG. 1, a conceptual block diagram of the MAC unit 10 features sixteen 8× multipliers 12, each with a corresponding adder 14, accumulator 18, and accumulator register 22. In this embodiment, the adder 14 is a 20-bit adder, the accumulator is a 20-bit accumulator, and the register 22 is a 20-bit register. A preclear multiplexer 20 is coupled to the adder and is used to initialize the accumulators 28. A postclear multiplexer 16 is also coupled to the adder 14 and is used to clear any accumulator 18 corresponding to an accumulator register 22 that has been accessed in order to retrieve the result of MAC operations. The preclear 20 and postclear 16 multiplexers are set by inputs 28, 30 received by the MAC unit 10. In addition, the unit 10 receives input (for instance, in a processing instruction) indicating whether the accumulator product should be saturated (SA 34) and/or whether the product should be shifted and saturated (SSP 32). The unit 10 is able to send overflow bits 24 to other registers in the processor, for instance hardware registers.

A DSE processor status word ("PSW") register controls processor operation in one embodiment of the invention. In FIG. 2, the PSW 122 is 32 bits long and includes the DSE program counter 124, which holds the address of the next DSE instruction to be executed. For purposes of the invention, the other bits of interest include bits 26 and 27, MACM0 128 and MACM1 130, which indicate the mode in which the MAC operates:

| Bit 27 | Bit 26 | Mode |
|---|---|---|
| 0 | 0 | Default mode |
| 0 | 1 | 8-bit packed mode (8 × 8 mode) |
| 1 | 0 | 16-bit packed mode (16 × 16 mode) |
| 1 | 1 | 32-bit mode (32 × 32 mode) |

Bit 28, the SA bit 132, indicates whether the accumulator value should be saturated (i.e., if the bit is set to "1," the value is saturated). Bit 29, the SSP bit 134, indicates whether the product should be shifted and saturated (i.e., if the bit is set to "1," the product is shifted and saturated). The remaining bits 136 are used to control processor operation. The use of the PSW and the assignment of bits is included here as an example; in other embodiments, the operation of the MAC may be controlled in other ways.

The MAC of the invention receives two z-bit words, each containing a number of m-bit operands, and, depending on the operation mode determined by an instruction, performs a number of m×m multiply accumulate operations. Results of the multiply accumulate operations are placed in accumulator registers, which may be accessed individually in order to retrieve results. FIG. 3 shows that in one embodiment of the invention, the MAC receives two 32-bit words as input which each contain, depending on the mode of operation, four independent 8-bit operands (8×8 mode), two independent 16-bit operands (16×16 mode), and one 32-bit word (32×32 mode). In both 8×8 and 16×16 modes, each operand is independently configured as signed or unsigned. In 8×8 mode, sixteen 8×8 MACs may be performed per cycle, resulting in sixteen 16-bit products accumulated into sixteen signed 20-bit accumulator registers. In 16×16 mode, four 16×16 MACs may be performed per cycle, with four 32-bit products accumulated into 4 signed 40-bit accumulator registers. In 32×32 mode, one 32×32 MAC is performed per cycle and one 64-bit product is accumulated into one of four signed 80-bit accumulator registers. Other embodiments of the invention may perform MAC operations on operands containing a different number of bits than listed above, for instance 64-bit operands.

Referring to FIG. 1, the MAC unit 10 receives two data words, A 38 and B 36, as input as well as an indication (for instance, in the instruction) of whether A 38 and B 36 are signed or unsigned 42, 40. The MAC unit 10 receives an activation signal 26 that also determines what mode it will operate in for the cycle, i.e., 8×8 mode 50, 16×16 mode 48, 24×24 mode 46 (in one embodiment, the MAC unit's 10 default mode is to operate as a 24×24 floating point MAC), or 32×32 mode 44.

As shown in FIG. 4, the data words A 38 and B 36 in one embodiment consist of 32 bits (or four bytes) apiece (in other embodiments, the words may consist of a larger or fewer number of bits). Depending on the mode of operation, each word may consist of one 32-bit operand 54 (i.e., DCBA and W3W2W1W0), two 16-bit operands 56 (i.e., DC, BA, W3W2, and W1W0, where D and W3 are the most significant bytes and A and W0 are the least significant bytes), or four 8-bit operands 58 (i.e., D, C, B, A, W3, W2, W1, and W0 where D and W3 are the most significant bytes and A and W0 are the least significant bytes).

As noted above, when the MAC unit operates in 8×8 mode, the results of sixteen 8×8 MAC operations are placed in sixteen 20-bit accumulator registers, or packed byte integer MAC accumulator registers (PBIMs). An example of how operands and the accumulator registers (here labeled 0 through 15) may be mapped follows:
PBIM15+=D*W3
PBIM14+=D*W2
PBIM13+=C*W3
PBIM12+=C*W2
PBIM11+=D*W1
PBIM10+=D*W0
PBIM9+=C*W1
PBIM8+=C*W0
PBIM7+=B*W3
PBIM6+=B*W2
PBIM5+=A*W3
PBIM4+=A*W2
PBIM3+=B*W1
PBIM2+=B*W0
PBIM1+=A*W1
PBIM0+=A*W0

In the preclear case (when the accumulators are set to "0"), the "+=" is replaced by "=." The accumulator registers are logical registers and can be implemented in any way so that the registers are shared regardless of the MAC's mode of operation.

In 16×16 mode, the results of four 16×16 multiply accumulate operations are placed in 40-bit accumulator register, or packed half-word integer MAC ("PHIM") accumulator registers. An example of how operands and PHIM accumulator registers (here labeled 0 through 3) may be mapped follows:
PHIM3+=DC*W3W2
PHIM2+=DC*W1W0
PHIM1+=BA*W3W2
PHIM0+=BA*W1W0

In the preclear case, the "+=" is replaced by "=." The accumulator registers are logical registers and can be implemented in any way so that the registers are shared regardless of the MAC's mode of operation.

In 32×32 mode, the results of the single 32×32 multiply accumulate operation is placed in one of four 80-bit accumulator registers, or unpacked integer MAC (UIM) accumulator registers. Which UIM register is used is determined by instruction type. An example of how the operands and UIM accumulator registers (where n is a number from 0 to 3) may be mapped follows:
UIM(n)+=DCBA*W3W2W1W0.

In the preclear case, the "+=" is replaced by "=." The accumulator registers are logical registers and can be implemented in any way so that the registers are shared regardless of the MAC's mode of operation.

In one embodiment, the PBIM, PHIM, and UIM registers use the same shared 320 bits as indicated in the following table. In other embodiments, other approaches may be employed.

| | | |
|---|---|---|
| PBIM0 [19:0] | | UIM0 [19:0] |
| PBIM1 [19:0] | | UIM0 [39:20] |
| PBIM2 [19:0] | | UIM0 [59:40] |
| PBIM3 [19:0] | | UIM0 [79:60] |
| PBIM4 [19:0] | PHIM0 [19:0] | UIM1 [19:0] |
| PBIM5 [19:0] | PHIM0 [39:20] | UIM1 [39:20] |
| PBIM6 [19:0] | PHIM1 [19:0] | UIM1 [59:40] |
| PBIM7 [19:0] | PHIM1 [39:20] | UIM1 [79:60] |
| PBIM8 [19:0] | PHIM2 [19:0] | UIM2 [19:0] |
| PBIM9 [19:0] | PHIM2 [39:20] | UIM2 [39:20] |
| PBIM10 [19:0] | PHIM3 [19:0] | UIM2 [59:40] |
| PBIM11 [19:0] | PHIM3 [39:20] | UIM2 [79:60] |
| PBIM12 [19:0] | | UIM3 [19:0] |
| PBIM13 [19:0] | | UIM3 [39:20] |
| PBIM14 [19:0] | | UIM3 [59:40] |
| PBIM15 [19:0] | | UIM3 [79:60] |

Figure 5:
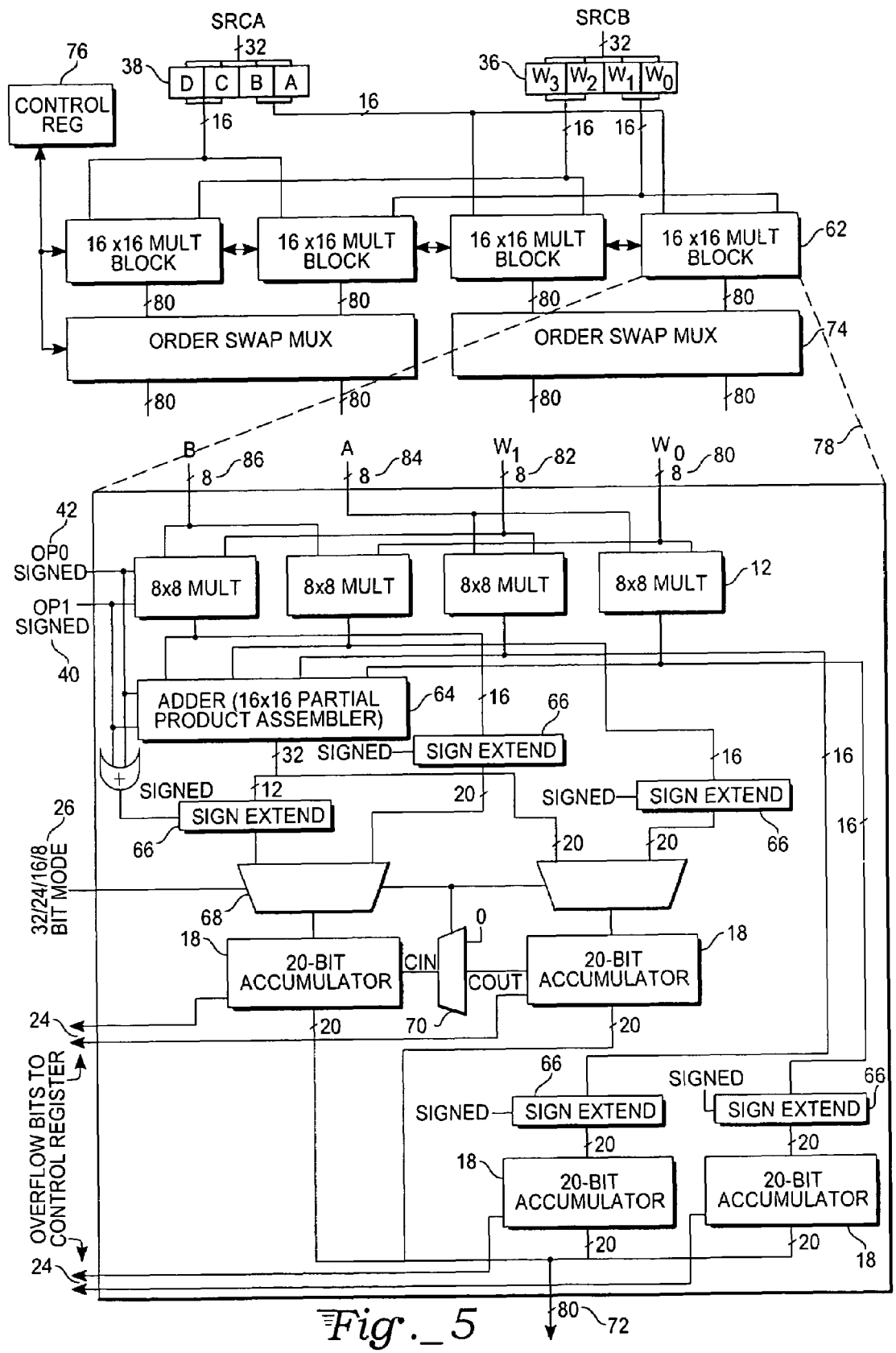
FIG. 5 is a block diagram of a 16×16 multiplier block in the apparatus of FIG. 1.

In FIG. 5, when the MAC is in 16×16 mode, the input words A 38 and B 36 are divided into 16-bit segments and sent to 16×16 multiplier blocks 62 which are described in greater detail 78 below. When the 16×16 multiplier block 62 is to determine the product of BA*W1W0, the individual operands B 86, A 84, W1 82, and W0 80 are input to 8×8 multiplier blocks 12. The multiplication operations are carried out and the results are output to an adder 64, which is a 16×16 partial product assembler, and each multiplier's 12 20-bit accumulator 18. The results may be sign extended 66 as necessary before being placed in the accumulators 18.

An indication 42, 40 of whether the operands are signed is provided (in one embodiment, as will be discussed in greater detail below, in the instruction). The accumulators 18 may add their contents to the products of the multipliers 12 unless a pre- or postclear operation has been performed, in which case the content of the accumulator is forced to "0." The products placed in the accumulator 18 are determined by the MAC's mode of operation 26. For instance, in 16×16 mode, the partial product from the adder 64 is passed through a multiplexer 68 and to the accumulator 18. However, in 8×8 mode, the product of the 8×8 operation is passed through the multiplexer to the accumulator 18. Overflow bits 24, 70 (discussed in greater detail below) are sent to the appropriate register 76. The products of the accumulators 18 are then sent to an order swap multiplexer 74 and then on to the accumulator registers.

Instructions are used to initiate packed integer MAC operations. In one embodiment, the instruction also specifies whether the operands are signed or unsigned. The following instructions, for use with Cradle's DSE coprocessor, are illustrative of the type of instructions that may be used with the MAC. Other instructions may be used in other embodiments. In the following table, the index "k" of the accumulator depends on the indices "i" and "j" of the packed operands.

| Instruction | Action | Comment |
|---|---|---|
| PIMACUU | A[i] * B[j] + PIM[k] → PIM[k] | A,B unsigned; 8 × 8, 16 × 16 mode (PIM is the accumulator value) |
| PIMACSU | A[i] * B[j] + PIM[k] → PIM[k] | A signed, B unsigned; 8 × 8, 16 × 16 mode |
| PIMACSS | A[i] * B[j] + PIM[k] → PIM[k] | A, B signed, 8 × 8, 16 × 16 mode |
| PIMACPUU | A[i] * B[j] → PIM[k] | A,B unsigned; 8 × 8, 16 × 16 mode; preclear all accumulators |
| PIMACPSU | A[i] * B[j] → PIM[k] | A signed, B unsigned; 8 × 8, 16 × 16 mode; preclear all accumulators |
| PIMACPSS | A[i] * B[j] → PIM[k] | A, B signed; 8 × 8, 16 × 16 mode; preclear all accumulators |
| IMAC0 | A * B + M[j] → M[j] | A, B unsigned; 32 × 32 mode; destination register UIM0 (M is the accumulator value) |
| IMAC1 | A * B + M[j] → M[j] | A, B unsigned; 32 × 32 mode; destination register UIM1 |
| IMAC2 | A * B + M[j] → M[j] | A, B unsigned; 32 × 32 mode; destination register UIM2 |
| IMAC3 | A * B + M[j] → M[j] | A, B unsigned; 32 × 32 mode; destination register UIM3 |
| IMACP0 | A * B + M[j] → M[j] | A, B unsigned; 32 × 32 mode; destination register UIM0; preclear accumulator |
| IMACP1 | A * B + M[j] → M[j] | A, B unsigned; 32 × 32 mode; destination register UIM1; preclear accumulator |

-continued

| Instruction | Action | Comment |
|---|---|---|
| IMACP2 | A * B + M[j] → M[j] | A, B unsigned; 32 × 32 mode; destination register UIM2; preclear accumulator |
| IMACP3 | A * B + M[j] → M[j] | A, B unsigned; 32 × 32 mode; destination register UIM3; preclear accumulator |

In embodiments where the MAC can also operate as a 24×24 floating point MAC ("FMAC"), the instructions can have the same opcodes as the FMAC.

The accumulator registers may be accessed using move-like instructions (i.e., the registers are used as source operands in move instructions). In one embodiment, the following logical registers may be accessed for results; other embodiments may employ a different approach.

1) Registers for Getting Sign-Extended 20-Bit Results for the 8×8 Case
  a) PBIM0-PBIM15—a 20-bit accumulator register value can be moved sign-extended to a 32-bit dual port data memory ("DPDM") register in the DSE.
  b) PBIMC0-PBIMC0—a 20-bit accumulator register value can be moved sign-extended to 32-bit DPDM register in the DSE; the accumulator is cleared at the end of the read cycle.

2) Registers for Getting Sign-Extended Upper 16-Bit Results for the 8×8 Case
  a) UPBIM0-UPBIM15—the sixteen most significant bits ("msbs") of the 20-bit accumulator register value can be moved sign-extended to a 32-bit DPDM register in the DSE.
  b) UPBIMC0-UPBIMC15—the sixteen msbs of the 20-bit accumulator register value can be moved sign-extended to a 32-bit DPDM register in the DSE; the accumulator is cleared at the end of the read cycle.

Note: Extracting the upper 16-bits and sign-extending the value is not integer division by sixteen with rounding towards zero. It is division by sixteen with rounding towards negative infinity.

3) Registers for Getting Two 16-Bit Results for the 8×8 Case Packed into a Single 32-Bit Register
  a) PLPBIMC0-PLPBIMC7—the sixteen least significant bits ("lsbs") of two 20-bit accumulator register values can be packed into one DPDM register; the accumulator is cleared at the end of the read cycle.
  b) PUPBIMC0-PUPBIMC7—the sixteen msbs of two 20-bit accumulator register values can be packed into one DPDM register; the accumulator is cleared at the end of the read cycle.

4) Registers for Getting Results for the 16×16 Case
  a) PHIMT0-PHIMT3—the 32 msbs of a 40-bit accumulator register value can be moved into a 32-bit DPDM register.
  b) PHIMTC0-PHIMTC3—the 32 msbs of a 40-bit accumulator register value can be moved into a 32-bit DPDM register; the accumulator is cleared at the end of the read cycle.

c) PHIMU0-PHIMU3—the 8 msbs of a 40-bit accumulator register value can be moved sign-extended into a 32-bit DPDM register.

5) Registers for Getting Results for the 32×32 Case
a) UIML0-UIML3—the 32 lsbs of an 80-bit accumulator register value can be moved into a 32-bit DPDM register.
b) UIMU0-UIMU3—the 32 msbs of an 80-bit accumulator register value can be moved into a 32-bit DPDM register.

The MAC unit described herein uses a two-stage pipeline. During the DSE execute stage, operands are clocked into the MAC pipeline. Results are available 2 cycles later. A register holds overflow bits from the MAC. In one embodiment, the overflow register is a read-only hardware register. The following tables show which overflow bits are visible depending on the MAC mode. Other embodiments may use a different approach.

| MAC Mode | Bit | Function |
|---|---|---|
| 00 | 31:0 | reserved |
| 01 | 31:18 | 16-bit PBIM(n) accumulator overflow bits |
| 01 | 17 | 16-bit PBIM1 accumulator overflow bit |
| 01 | 16 | 16-bit PBIM0 accumulator overflow bit |
| 01 | 15:2 | 20-bit PBIM(n) accumulator overflow bits |
| 01 | 1 | 20-bit PBIM1 accumulator overflow bit |
| 01 | 0 | 20-bit PBIM0 accumulator overflow bit |
| 10 | 31:8 | reserved |
| 10 | 7 | 32-bit PHIM3 accumulator overflow bit |
| 10 | 6 | 32-bit PHIM2 accumulator overflow bit |
| 10 | 5 | 32-bit PHIM1 accumulator overflow bit |
| 10 | 4 | 32-bit PHIM0 accumulator overflow bit |
| 10 | 3 | 40-bit PHIM3 accumulator overflow bit |
| 10 | 2 | 40-bit PHIM2 accumulator overflow bit |
| 10 | 1 | 40-bit PHIM1 accumulator overflow bit |
| 10 | 0 | 40-bit PHIM0 accumulator overflow bit |
| 11 | 31:8 | reserved |
| 11 | 7 | 64-bit UIM3 accumulator overflow bit |
| 11 | 6 | 64-bit UIM2 accumulator overflow bit |
| 11 | 5 | 64-bit UIM1 accumulator overflow bit |
| 11 | 4 | 64-bit UIM0 accumulator overflow bit |
| 11 | 3 | 80-bit UIM3 accumulator overflow bit |
| 11 | 2 | 80-bit UIM2 accumulator overflow bit |
| 11 | 1 | 80-bit UIM1 accumulator overflow bit |
| 11 | 0 | 80-bit UIM0 accumulator overflow bit |

Signed overflow occurs when the two inputs to the accumulator adder have the same sign but the output of the adder has the opposite sign. If A and B are the inputs to the adder and Sum is the output, the accumulator overflow bits are defined as follows:

16-bit PBIM(n) overflow=(A[15] XNOR B[15]) AND (A[15] XOR Sum[15])

20-bit PBIM(n) overflow=(A[19] XNOR B[19]) AND (A[19] XOR Sum[19])

32-bit PHIM(n) overflow=(A[31] XNOR B[31]) AND (A[31] XOR Sum[31])

40-bit PHIM(n) overflow=(A[39] XNOR B[39]) AND (A[39] XOR Sum[39])

When both operands are signed, or only operand A is signed, overflow is calculated for MAC operations in one of two ways depending on the embodiment. The calculations are as follows:

Overflow from bit $n-1$=CarryOut($n-1$) XOR CarryOut($n-2$) of adder, or     i)

Overflow=~(SignProduct XOR SignAccumulator Operand) AND (SignAdder XOR SignProduct)     ii)

When both operands in an 8×8 or 16×16 operation are unsigned, the value of the 16- or 32-bit overflow bit is undefined. The accumulator overflow bits for unsigned addition are as follows:
64-bit UIM(n) overflow="UIM(n) bit 63 carry-out"
80-bit UIM(n) overflow="UIM(n) bit 80 carry-out"

Overflow bits are sticky and remain set unless cleared explicitly, for instance, when the corresponding accumulator is cleared by accessing a postclear register or when a pre-clear instruction is executed.

Figure 6:
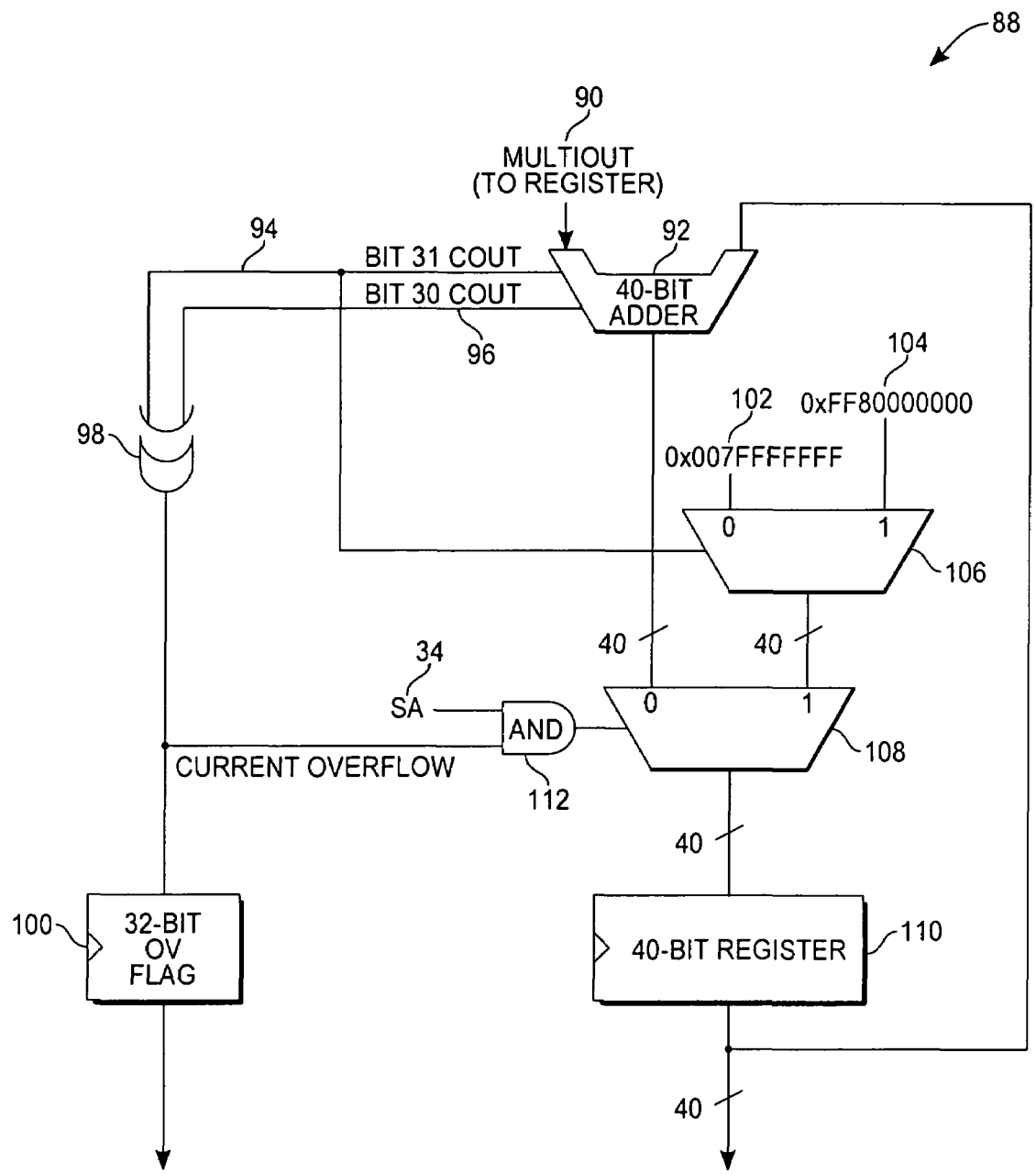
FIG. 6 is a block diagram of a saturation circuit in the apparatus of FIG. 1.

In FIG. 6, in 16×16 mode, accumulator values 90 may be saturated after the accumulator values are provided. In one embodiment, the SA bit 34 in the PSW is set to indicate saturation should occur if there is overflow from bit 31 94. If these conditions are met 112, and the overflow is in the positive direction, then 0x7fffffff 102 is sent to the register 110. If the overflow is in the negative direction, 0xff80000000 104 is sent to the register.

Figure 7A:
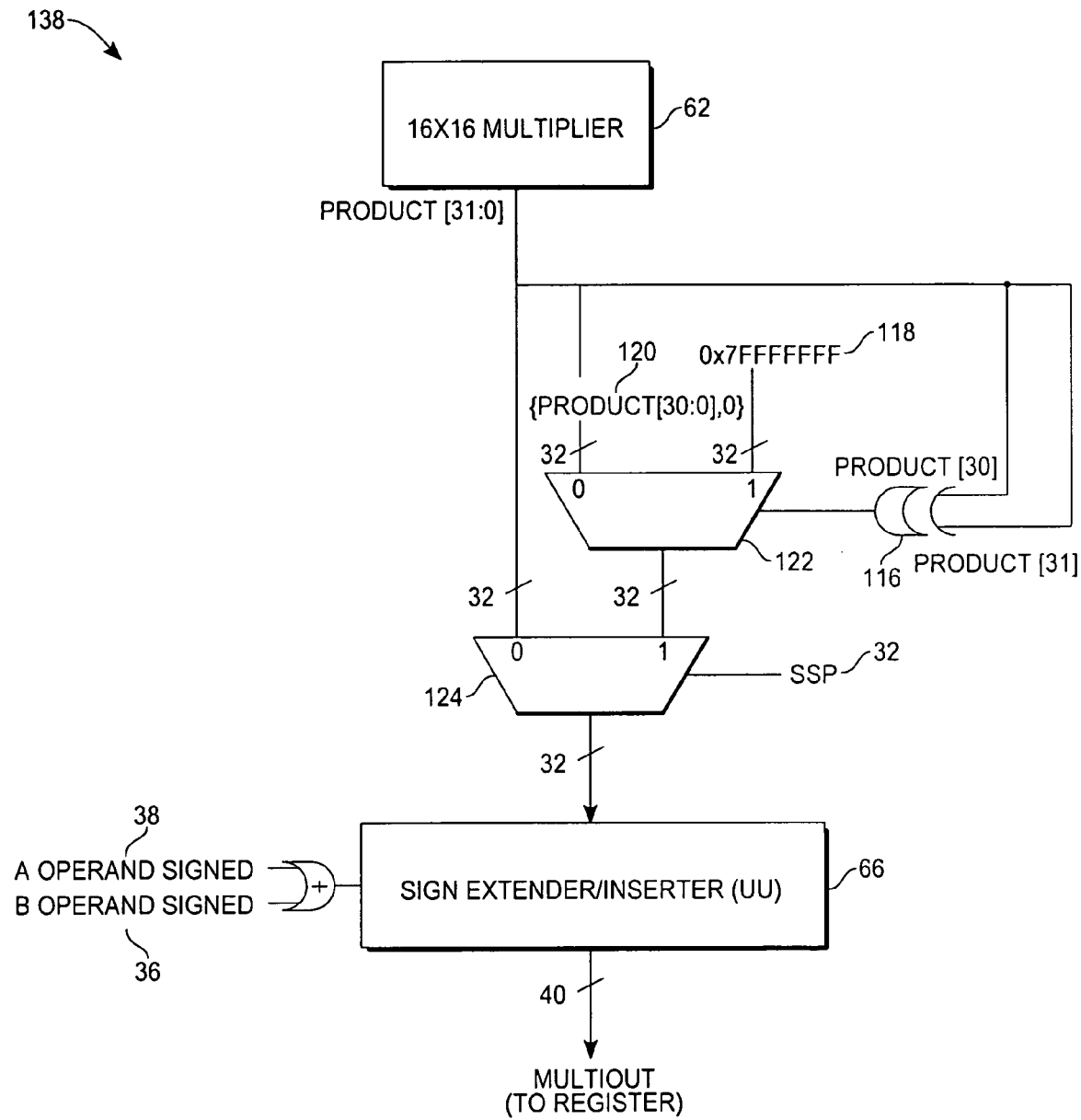
FIG. 7a is a block diagram of a shift and saturate circuit in the apparatus of FIG. 1.

In FIG. 7a, in 16×16 mode a bit (in one embodiment, the SSP bit in the PSW) 32 may be set to shift left by one and saturate the product if necessary before it is sent to the register. When the bit 32 is set, the product from the multiplier block 62 is shifted left by 1 120 and saturated 118 where necessary. When 0x8000 is multiplied by 0x8000, the result is 0x40000000. When 0x40000000 is shifted left multiply by 2, the sign changes. If this occurs, the result must be saturated 18 to the greatest positive number, 0x7FFFFFFF. The results can be sign extended 66, depending on the operands 36, 38.

Figure 7B:
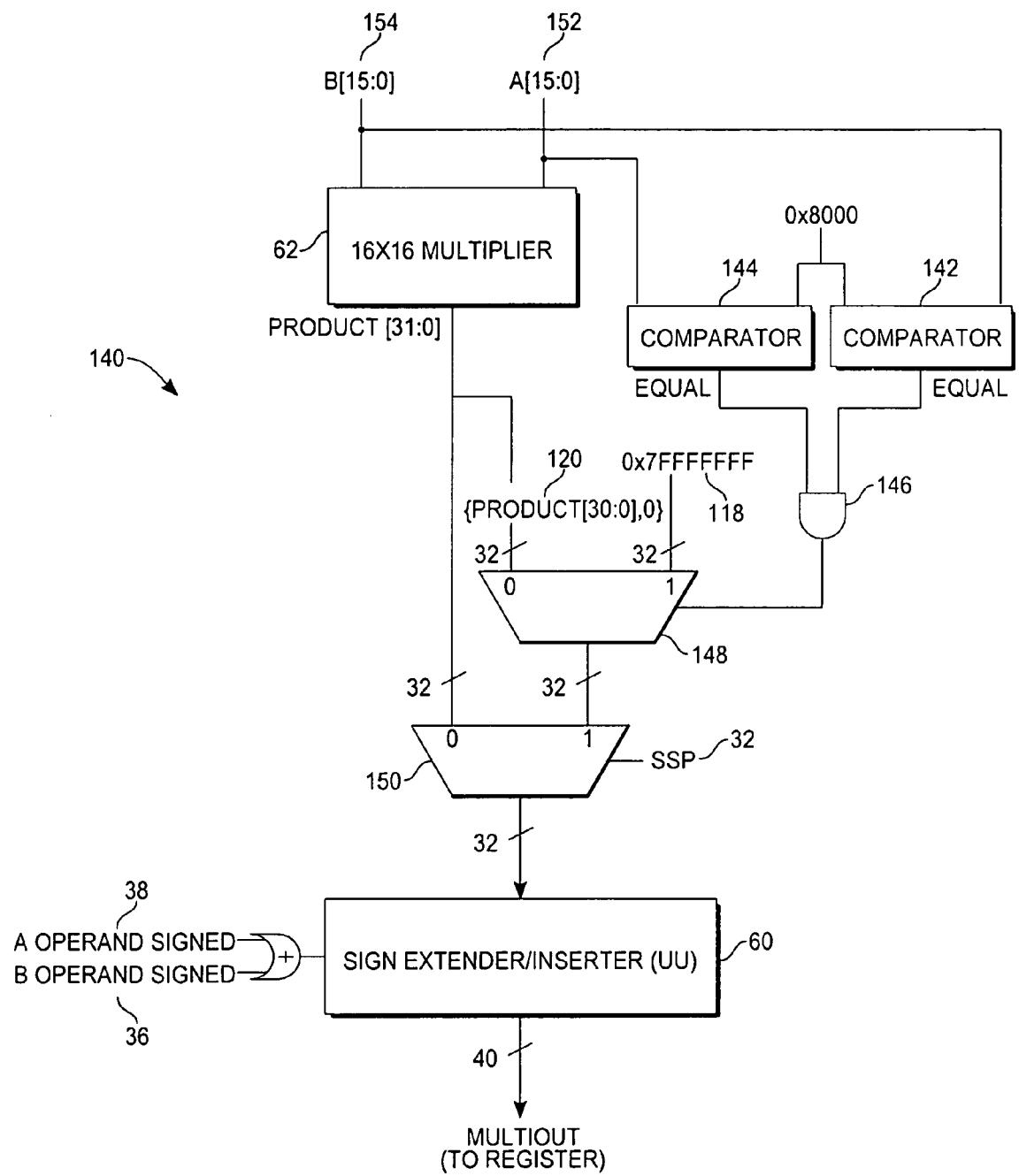
FIG. 7b is a block diagram of a shift and saturate circuit in the apparatus of FIG. 1.

In FIG. 7b, an alternative method 140 of saturation uses two comparators 142, 144 to explicitly check the input operands. Saturation only occurs if both input operands 152. 154 are 0x8000. A check of whether both inputs are 0x8000 146 will determine if saturation 118 is required.

Figure 8:
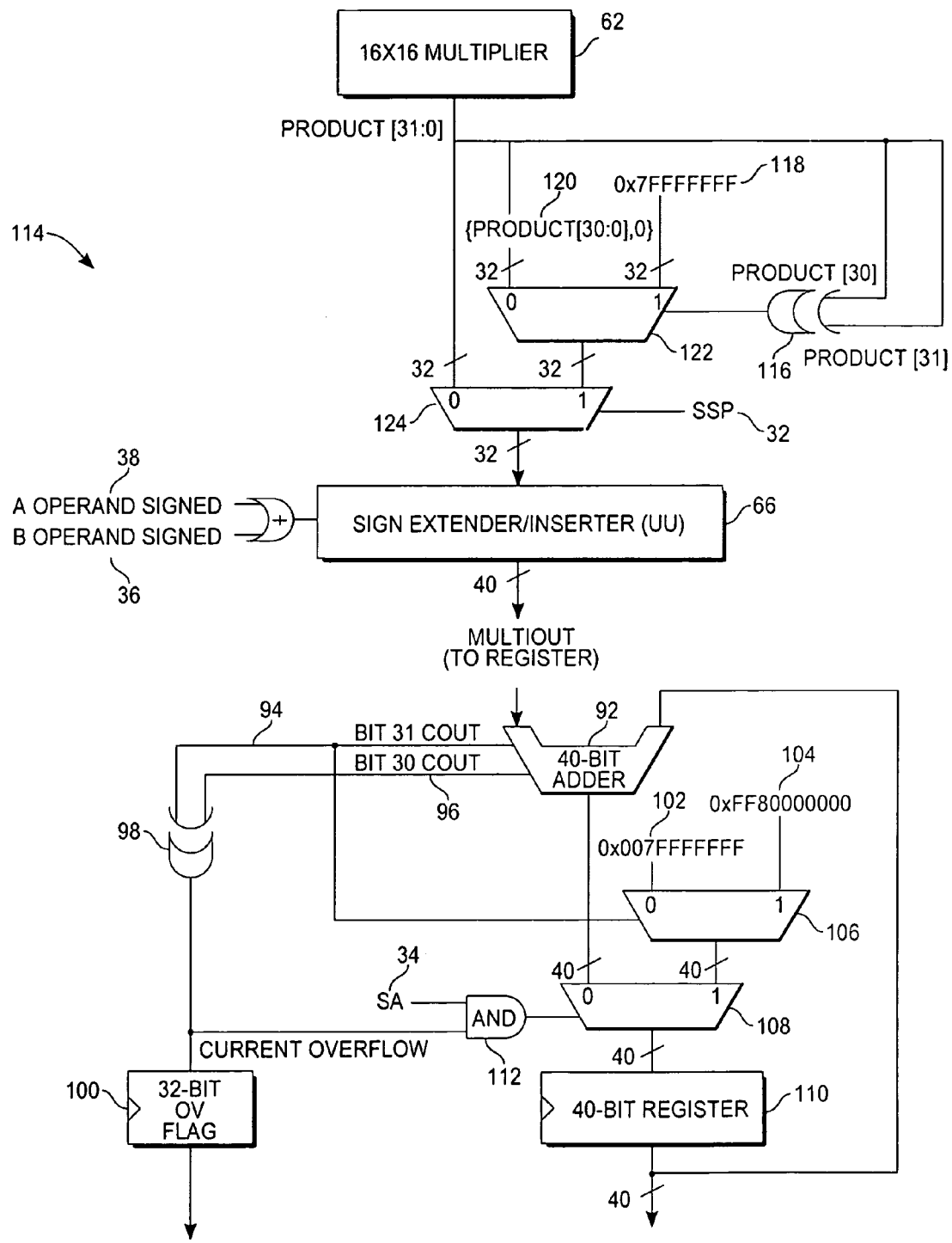
FIG. 8 is a block diagram of a combined saturation circuit in the apparatus of FIG. 1.

FIG. 8 shows the combined saturation circuit 114; the aspects of the combined circuit 114 have been discussed in FIGS. 6 and 7a.

The invention claimed is:
1. An apparatus for performing parallel integer multiply accumulate operations on packed data comprising:
a) a number of multipliers for multiplying two z-bit words inputted into the apparatus, the two z-bit words each having a number of m-bit operands;
b) a number of j-bit accumulators, each of the number of j-bit accumulators combining the result of at least one multiplier and a value stored in the j-bit accumulator, each of the number of j-bit accumulators coupled to at least one of the first number of multipliers;
c) a number of n-bit accumulator registers for accessing results of operation performed by the j-bit accumulators, each of the number of n-bit accumulator registers coupled to at least one of the number of j-bit accumulators;
d) means for receiving an input command specifying a mode of operation for the apparatus, the means coupled to the number of multipliers, the mode of operation indicating a number of m-bit operands contained in each z-bit word and an m×m mode of each multiplier, wherein if m is less than z, products of each m-bit operand of a first z-bit word multiplied by each m-bit operand of a second z-bit word are obtained, wherein the number of n-bit accumulator registers is sufficient to store each product regardless of the mode of operation.

2. The apparatus of claim 1 wherein the results stored in each n-bit accumulator register may be individually retrieved and the j-bit accumulator corresponding to the accessed n-bit accumulator cleared after retrieval if the accessed n-bit accumulator register is a postclear register.

3. The apparatus of claim 1 wherein, depending on the mode specified, the input and output are one of the following:
   a) each of the two z-bit words is 32 bits and has four independent 8-bit operands and sixteen 16-bit products are accumulated into sixteen signed 20-bit accumulator registers, wherein each operand is independently configured as signed or unsigned;
   b) each of the two z-bit words is 32 bits and has two independent 16-bit operands and four 32-bit products are accumulated into four signed 40-bit accumulator registers, wherein each operand is independently configured as signed or unsigned; or
   c) each of the two z-bit words is 32 bits and has one 32-bit operand and one 64-bit product is accumulated into a signed 80-bit accumulator register.

4. The apparatus of claim 1 further comprising adding means for adding together results of at least two of the number of multipliers to assemble a partial product before outputting the partial product to a j-bit accumulator, wherein the adding means is coupled to the number of multipliers.

5. The apparatus of claim 1 further comprising means for globally initializing each of the number of j-bit accumulators.

6. The apparatus of claim 1 further comprising means for shifting results of operations in the j-bit accumulators.

7. The apparatus of claim 1 further comprising means for saturating results of the operations in the j-bit accumulators.

8. The apparatus of claim 1 further comprising means for storing overflow bits from the j-bit accumulators in a register.

9. The apparatus of claim 1 wherein, depending on the input command, the apparatus operates in one of the following modes:
   a) 8×8 mode;
   b) 16×16 mode; or
   c) 32×32 mode.

10. A method for performing parallel integer multiply accumulate operations on packed data comprising:
   a) receiving a command indicating a mode of operation;
   b) receiving two z-bit words containing a number of m-bit operands;
   c) multiplying the m-bit operands in a number of m×m operations as required by the mode of operations, wherein if m is less than z, products of each m-bit operand of a first z-bit word multiplied by each m-bit operand of a second z-bit word are obtained; and
   d) accumulating each result of the multiplication operations with a value stored in an accumulator corresponding to a multiplier producing the result of the multiplication operation.

11. The method of claim 10 further comprising accessing at least one n-bit accumulator register to retrieve results of multiply accumulate operations.

12. The method of claim 11 further comprising individually retrieving the result of a multiply-accumulate operation and clearing the j-bit accumulator corresponding to the accessed n-bit accumulator register if the accessed n-bit accumulator register is a postclear register.

13. The method of claim 10 wherein, depending on the mode specified, the input and output are one of the following:
   a) each of the two z-bit words is 32 bits and has four independent 8-bit operands and sixteen 16-bit products are accumulated into sixteen signed 20-bit accumulator registers, wherein each operand is independently configured as signed or unsigned;
   b) each of the two z-bit words is 32 bits and has two independent 16-bit operands and four 32-bit products are accumulated into four signed 40-bit accumulator registers, wherein each operand is independently configured as signed or unsigned; or
   c) each of the two z-bit words is 32 bits and has one 32-bit operand and one 64-bit product is accumulated into a signed 80-bit accumulator register.

14. The method of claim 10 further comprising adding together results of at least two of the number of m×m operations to assemble a partial product before outputting the partial product to a j-bit accumulator.

15. The method of claim 10 further comprising packing two results into a single accumulator register.

16. The method of claim 10 further comprising a step of storing overflow bits from the j-bit accumulators in a register.

17. The method of claim 10 further comprising a step of globally initializing all j-bit accumulators.

18. The method of claim 10 further comprising a step of shifting results in the j-bit accumulators.

19. The method of claim 10 further comprising a step of saturating results in the j-bit accumulators.

20. A method for performing parallel integer multiply accumulate operations on packed data comprising:
   a) inputting to a multiply-accumulate unit two z-bit words containing a number of m-bit operands;
   b) inputting a command specifying a mode of operation to the multiply-accumulate unit, the mode of operation indicating a number of m-bit operands contained in each z-bit word and an m×m mode of each multiplier in the multiply-accumulate unit;
   c) multiplying the m-bit operands in a number of m×m operations to obtain a number of 2 m-bit products, wherein if m is less than z, products of each m-bit operand of a first z-bit word multiplied by each m-bit operand of a second z-bit word are obtained;
   d) adding the content of at least one of a number of j-bit accumulators to the 2 m-bit product of each multiplier performing the m×m operation producing each 2 m-bit product to obtain a number of 2 m-bit results;
   e) outputting the number of 2 m-bit results into a number of n-bit accumulator registers, wherein the number of 2 m-bit results are output in the same cycle.

21. The method of claim 20 further comprising individually retrieving the result of a multiply-accumulate operation and clearing the j-bit accumulator corresponding to the accessed n-bit accumulator register if the accessed n-bit accumulator register is a postclear register.

22. The method of claim 20 wherein, depending on the mode specified, the input and output are one of the following:
   a) each of the two z-bit words is 32 bits and has four independent 8-bit operands and sixteen 16-bit products are accumulated into sixteen signed 20-bit accumulator registers, wherein each operand is independently configured as signed or unsigned;
   b) each of the two z-bit words is 32 bits and has two independent 16-bit operands and four 32-bit products are accumulated into four signed 40-bit accumulator registers, wherein each operand is independently configured as signed or unsigned; or
   c) each of the two z-bit words is 32 bits and has one 32-bit operand and one 64-bit product is accumulated into a signed 80-bit accumulator register.

23. The method of claim 20 further comprising adding together results of at least two of the number of m×m operations to assemble a partial product before outputting the partial product to a j-bit accumulator.

24. The method of claim 20 further comprising packing two results into a single accumulator register.

25. The method of claim 20 further comprising a step of storing overflow bits from the j-bit accumulators in a register.

26. The method of claim 20 further comprising a step of globally initializing all j-bit accumulators.

27. The method of claim 20 further comprising a step of shifting 2 m-bit results in the j-bit accumulators.

28. The method of claim 20 further comprising a step of saturating 2 m-bit results in the j-bit accumulators.

* * * * *